A. KENWORTHY.
SUBSOIL BREAKING ATTACHMENT.
APPLICATION FILED JUNE 26, 1911.
1,031,343.
Patented July 2, 1912.
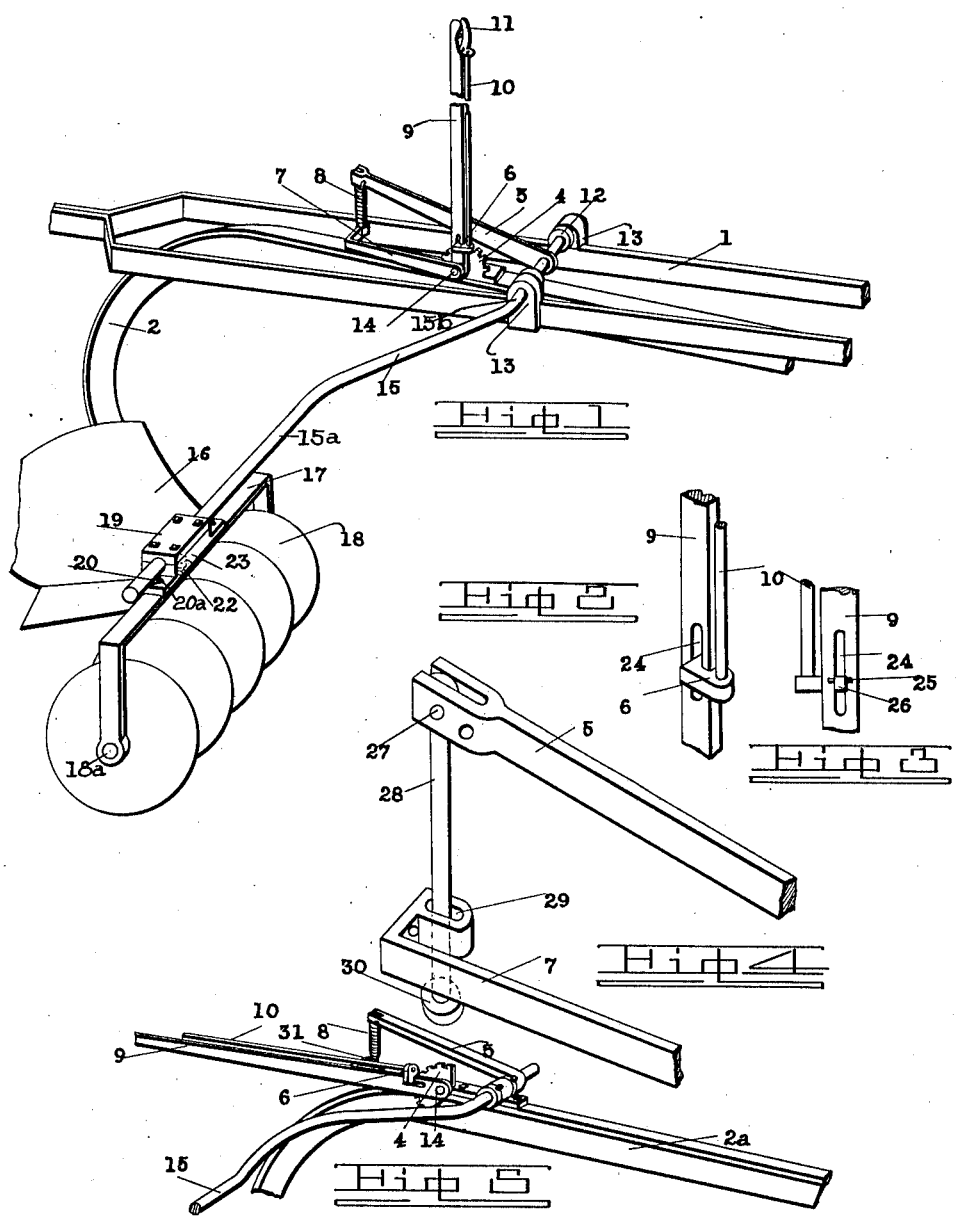
Witnesses;
Inventor,
Amos Kenworthy
By
Attorney.

UNITED STATES PATENT OFFICE.

AMOS KENWORTHY, OF HILLSDALE, OREGON.

SUBSOIL-BREAKING ATTACHMENT.

1,031,343. Specification of Letters Patent. Patented July 2, 1912.

Application filed June 26, 1911. Serial No. 635,379.

*To all whom it may concern:*

Be it known that I, AMOS KENWORTHY, a citizen of the United States, residing at Hillsdale, in the county of Multnomah and State of Oregon, have invented certain new and useful Improvements in Subsoil-Breaking Attachments, of which the following is a specification.

This invention relates to sub-soil breaking attachments for plows, and has for its object to provide an attachment which may be employed upon either walking or sulky plows and which will permit the subsoil cutters to be carried in the furrow, either to the front or to the rear of the plow share. I accomplish these objects by the mechanism illustrated in the accompanying drawing, in which—

Figure 1 is a perspective view of a sulky frame upon which my improved attachment is mounted. Fig. 2 is a perspective view of a fragment of the operating lever. Fig. 3 is a side view of same. Fig. 4 is a detail view of the connecting mechanism. Fig. 5 is a perspective view of a modification showing the device attached to the beam of a "walking plow".

In each of the views, similar characters of reference designate similar parts of structure.

In the drawing, 1 designates the frame work of the usual sulky plow, upon which is mounted the mechanism for attaching and operating a subsoiling device. Upon said frame work are fixed the bearing lugs 13, in which is suitably mounted the section 15ᵇ of the shaft 15, carrying any suitable stirring means; and for purposes of illustration I have here employed a plurality of disks 18. These disks are fixed upon the shaft 18ᵃ, which has its bearings in the yoke 17, and upon this yoke is secured the clamp 23 by means of bolts 20, in the transverse slots 20ᵃ, formed in the projecting ends of the lower member of said clamp. The upper member 19 of the clamp is bound upon the lower, and thereby upon the section 15ᵃ of the shaft, by means of the bolts 22. The transverse portion 15ᵃ of said shaft is made to stand across the furrow immediately in front of the plow share 16, so that the disks will cut the unbroken earth in the bottom of the furrow made by the plow in its preceding "round". The upper portion of the shaft is bent at 15ᵇ to form the section journaled in the bearing lugs 13, which is held in place by the shoulders 12. To the shaft, between said shoulders 12 is rigidly secured the arm 5, extending to the rear.

At a convenient point on the plow-beam is secured a quadrant-shaped bracket 4 provided with peripheral notches and having mounted at its axial center, upon the pin 14, an operating lever 9, carrying the rod 10, to the lower end of which is attached the pawl 6. This pawl consists of an enlarged transverse member having a projection 26 extending through the vertical slot 24 of the lever for engagement in the notches of said quadrant-shaped bracket; and it is held in place by the pin 25. The rod 10 is operated by the spring controlled hand lever 11.

Upon the pin 14 to which the lever 9 is rigidly secured, is also secured in a similar manner, the arm 7, which extends to the rear and has the lateral projection 7ᵃ standing beneath the end of the arm 5, in which is formed the oblong opening 29. Within said opening is loosely secured the bolt 28, having the head 30 at its lower end, and the upper end is pivotally secured to arm 5 by means of pin 27. Upon said bolt is placed a coil spring 8 which is secured to the arms 5 and 7, in suitable apertures made therein for the purpose. The slot 29 permits a longitudinal vibration of the bolt as the said arms are operated by the lever 9, and the head 30 is designed to relieve the spring when force greater than it should sustain is applied upon it, as a result of obstacles striking the subsoil cutters.

In Fig. 5 is shown a modification for walking plows, in which the sub-soiler is carried at the rear of the mold-board. The lever-supporting bracket is suitably adjusted upon the beam 2ᵃ and the lever 9 extends in a horizontal position to the rear for convenience in operation. In this case the support for the spring 8 consists of the laterally projecting arm 31 extending from said lever 9.

It is obvious that in either case the disks may be set to cut the required depth, by adjustment of lever 9. The spring 8 allows of such variations of movement in the subsoiler as will result from the varying conditions of soil and from contact with obstacles to a limited extent, without imparting such motion to the plow. A horizontal adjustment of the disks is obtained by means of the bolts 20 in the slots 20ª, so that the cutters may be properly positioned across the furrow, to secure their proper movement and to cover the required area.

Having thus described by invention, what I claim as new and desire to secure by Letters Patent, is—

1. A sub-soil breaking attachment for plows comprising a shaft having a plurality of breaking devices fixed thereon and rotating therewith, a yoke affording journal support for said shaft, a carrying shaft having each end portion bent to stand at right angles to the body portion, the upper end thereof having a journal support on the plow while the other end is made to depend and to project across the furrow, a clamp connecting said yoke to said depending end, means for adjusting the angle and position of the yoke with refernce to the depending end, a lever pivotally mounted upon the plow beam and having a rearwardly extending arm fixed thereto, an arm rigidly secured to said carrying shaft and standing above the first mentioned arm, and means for connecting the free ends of said arms, whereby by the operation of said lever the sub-soil breaking devices may be raised and lowered.

2. A sub-soil breaking attachment for plows comprising a shaft having a plurality of breaking devices fixed thereon and rotating therewith, a yoke affording journal support for said shaft, a carrying shaft having each end portion bent to stand at right angles to the body portion, the upper end thereof having a journal support on the plow while the other end is made to depend and to project across the furrow, a clamp connecting said yoke to said depending end, a lever pivotally mounted upon the plow beam and having a rearwardly extending arm fixed thereto, an arm rigidly secured to said carrying shaft and standing above the first mentioned arm, and means for yieldingly connecting the free ends of said arms, whereby the vertical movement of the sub-soil devices is controlled.

In testimony whereof I affix my signature in presence of two witnesses.

AMOS KENWORTHY.

Witnesses:
M. REYNOLDS,
W. D. ORDWAY.

Copies of this patent may be obtained for five cents each, by addressing the "Commissioner of Patents, Washington, D. C."